US012092968B2

(12) United States Patent
Nishiyama

(10) Patent No.: US 12,092,968 B2
(45) Date of Patent: Sep. 17, 2024

(54) PROCESS UNIT AND IMAGE-FORMING APPARATUS

(71) Applicant: SHARP KABUSHIKI KAISHA, Sakai (JP)

(72) Inventor: Takeshi Nishiyama, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/108,804

(22) Filed: Feb. 13, 2023

(65) Prior Publication Data

US 2023/0314978 A1 Oct. 5, 2023

(30) Foreign Application Priority Data

Mar. 30, 2022 (JP) ................................ 2022-054874

(51) Int. Cl.

*G03G 15/02* (2006.01)
*G03G 21/18* (2006.01)

(52) U.S. Cl.

CPC ..... *G03G 15/0216* (2013.01); *G03G 21/1814* (2013.01); *G03G 21/1821* (2013.01); *G03G 2215/025* (2013.01); *G03G 2221/1657* (2013.01)

(58) Field of Classification Search

CPC .......... G03G 15/0216; G03G 21/1814; G03G 21/1821; G03G 21/1828; G03G 2215/025
See application file for complete search history.

(56) References Cited

U.S. PATENT DOCUMENTS

2016/0216688 A1 7/2016 Katayama
2016/0252878 A1 * 9/2016 Kimura ............ G03G 21/1814
399/176

FOREIGN PATENT DOCUMENTS

JP 2015129892 A * 7/2015
JP 2016-133776 A 7/2016

OTHER PUBLICATIONS

JP 2015129892 English machine translation, Kuninori, Jul. 16, 2015 (Year: 2015).*

* cited by examiner

*Primary Examiner* — Thomas S Giampaolo, II
(74) *Attorney, Agent, or Firm* — ScienBiziP, P.C.

(57) ABSTRACT

A process unit includes a photoreceptor drum, a charging roller, and a cam member. The cam member includes a mounting portion that externally fits to a shaft portion of the charging roller and a contact portion that protrudes to an outside of the mounting portion. Then, the charging roller is maintained in a separate state by bringing the contact portion of the cam member into contact with an outer surface of the drum main body, and the charging roller is switched to a contact state by rotating the cam member dependently with rotation of the photoreceptor drum in a normal direction.

17 Claims, 8 Drawing Sheets

PROCESS UNIT AND IMAGE-FORMING APPARATUS

BACKGROUND OF THE INVENTION

Field of the Invention

This disclosure relates to an image-forming apparatus and particularly relates to, for example, a process unit and an image-forming apparatus that include a photoreceptor drum and a charging roller for charging the photoreceptor drum.

Description of the Background Art

It is known that the conventional process unit (photoreceptor unit) includes a photoreceptor (photoreceptor drum), a charging roller for charging the photoreceptor, and a first energizing means that energizes the charging roller in a direction toward the photoreceptor in which the process unit is removably provided on the image-forming apparatus main body. Further, the process unit additionally includes a rotation member that is rotated by driving force input from the image-forming apparatus main body, a separation member, a support member that presses the separation member with the separation member in its separate position to support the separation member, and a second energizing means that energizes the support member in a direction toward the axis of rotation of the separation member. The separation member has an engagement portion that engages with the rotation member to receive the driving force from the rotation member, and can rotate between a separate position for maintaining a separate state in which the photoreceptor and the charging roller are separated from each other with the engagement portion engaging with the rotation member, and a release position for releasing the separate state between the photoreceptor and the charging roller to allow the contact between the photoreceptor and the charging roller. When releasing the separate state, the separation member moves in a direction toward the photoreceptor along with the movement of the charging roller toward the photoreceptor by the first energizing means. Further, the separation member has such a shape that, when the separation member receives driving force from the rotation member to rotate from the separate position toward the release position, a direct distance between the axis of rotation and the support member that presses the separation member while being energized by the second energizing means increases.

In the technique of the conventional process unit, the photoreceptor drum and the charging roller are separated from and brought into contact with each other by using gears (gear teeth) that are provided on both of the separation member mounted on the shaft of the charging roller and the shaft of the photoreceptor drum. This makes the structure of the process unit complicated and also increases the cost. Further, it is required to secure spaces for providing gears on both sides of the drum main body of the photoreceptor drum, and hence, the longitudinal size of the process unit increases.

According to the above, the main object of the present disclosure is to provide a novel process unit and a novel image-forming apparatus.

Another object of the present disclosure is to provide a process unit and an image-forming apparatus that can allow a charging roller to be separated from and brought into contact with a photoreceptor drum by a simple structure.

SUMMARY OF THE INVENTION

The first invention is a process unit including a photoreceptor drum and a charging roller that charges the photoreceptor drum, the process unit including a cam member that is rotatably provided on each of both end portions of a shaft portion of the charging roller at a position within a longitudinal range of a drum main body of the photoreceptor drum, wherein the charging roller is provided so as to be switchable between a separate state in which the charging roller is separated from the photoreceptor drum and a contact state in which the charging roller contacts the photoreceptor drum, the cam member includes an annular-shaped mounting portion that externally fits to the shaft portion of the charging roller and a contact portion that protrudes to an outside of an outer surface of the mounting portion, and the charging roller is maintained in the separate state by bringing the contact portion of the cam member into contact with an outer surface of the drum main body, and the charging roller is switched from the separate state to the contact state by rotating the cam member in a normal direction dependently with rotation of the photoreceptor drum in a normal direction due to frictional force between the drum main body and the contact portion to release the contact of the contact portion to the drum main body.

According to the first invention, by the simple configuration in which the shaft portion of the charging roller is provided with the cam member, the charging roller can be appropriately brought into contact with and separated from the photoreceptor drum. Further, since the cam member is provided at a position within a longitudinal range of the drum main body of the photoreceptor drum, it is possible to prevent the process unit from becoming larger in the longitudinal direction.

The second invention is the process unit according to the first invention, wherein a coefficient of friction of a contact surface of the contact portion that contacts the drum main body is larger than a coefficient of friction of the other part of the cam member.

According to the second invention, when the charging roller is in the separate state, the cam member can be surely rotated with the rotation of the photoreceptor drum.

The third invention is the process unit according to the second invention, wherein the contact surface of the contact portion is made of an elastic material.

The fourth invention is the process unit according to any one of the first to third inventions, wherein the contact portion has a plate spring shape that is elastically deformable in a direction to be separated from and brought into contact with the charging roller, and energizes the drum main body in a direction to be separated from the charging roller.

According to the fourth invention, even if an oscillation or an impact is applied to the process unit, the elasticity of the contact portion can absorb the oscillation or the impact. Therefore, when the charging roller is in the separate state, the contact state of the contact portion of the cam member to the drum main body can be appropriately maintained.

The fifth invention is the process unit according to any one of the first to fourth inventions, wherein the cam member includes a grip portion for manually rotating the cam member.

According to the fifth invention, the cam member can be manually and easily rotated and the charging roller can be easily switched between the separate state and the contact state.

The sixth invention is the process unit according to any one of the first to fifth inventions, wherein the cam member includes a first restricting portion that restricts reverse rotation of the cam member when the charging roller is in the separate state and restricts normal rotation of the cam member when the charging roller is in the contact state.

The seventh invention is the process unit according to any one of the first to sixth inventions, wherein the cam member includes a second restricting portion that restricts reverse rotation of the cam member when the charging roller is in the contact state.

The eighth invention is the process unit according to any one of the first to seventh inventions, the process unit including a cleaning roller that is provided to be able to be separated from and brought into contact with the charging roller, wherein the cam member is formed to protrude at the position opposite to the contact portion to an outside of the outer surface of the mounting portion and includes a second contact portion that can bring the charging roller into contact with the cleaning roller and separate the charging roller from the cleaning roller.

According to the eighth embodiment, when the charging roller is separated from and brought into contact with the photoreceptor drum, the cleaning roller can be simultaneously separated from and brought into contact with the charging roller.

The ninth invention is the process unit according to any one of the first to eighth inventions, the process unit including a one-way clutch that does not transfer rotation of the charging roller to the cam member when the charging roller rotates in the normal direction and transfers rotation of the charging roller to the cam member when the charging roller rotates in a reverse direction, wherein, when the charging roller is in the contact state, the charging roller can be switched from the contact state to the separate state by bringing the contact portion of the cam member into contact with an outer surface of the drum main body by rotating the photoreceptor drum in the reverse direction to rotate the charging roller and the cam member in a reverse direction.

According to the ninth invention, the charging roller can be automatically switched from the contact state to the separate state by rotating the photoreceptor drum in the reverse direction.

The tenth invention is an image-forming apparatus including the process unit according to any one of the first to ninth inventions.

According to the disclosure, by the simple configuration in which the shaft portion of the charging roller is provided with the cam member, the charging roller can be appropriately separated from and brought into contact with the photoreceptor drum. Further, since the cam member is provided at a position within a longitudinal range of the drum main body of the photoreceptor drum, it is possible to prevent the process unit from becoming larger in the longitudinal direction.

The above-described object, another object, characteristics, and advantages of the disclosure will be further revealed from the following detailed description of embodiments taken with reference to the drawings.

DESCRIPTION OF THE PREFERRED EMBODIMENTS

First Embodiment

Figure 1:
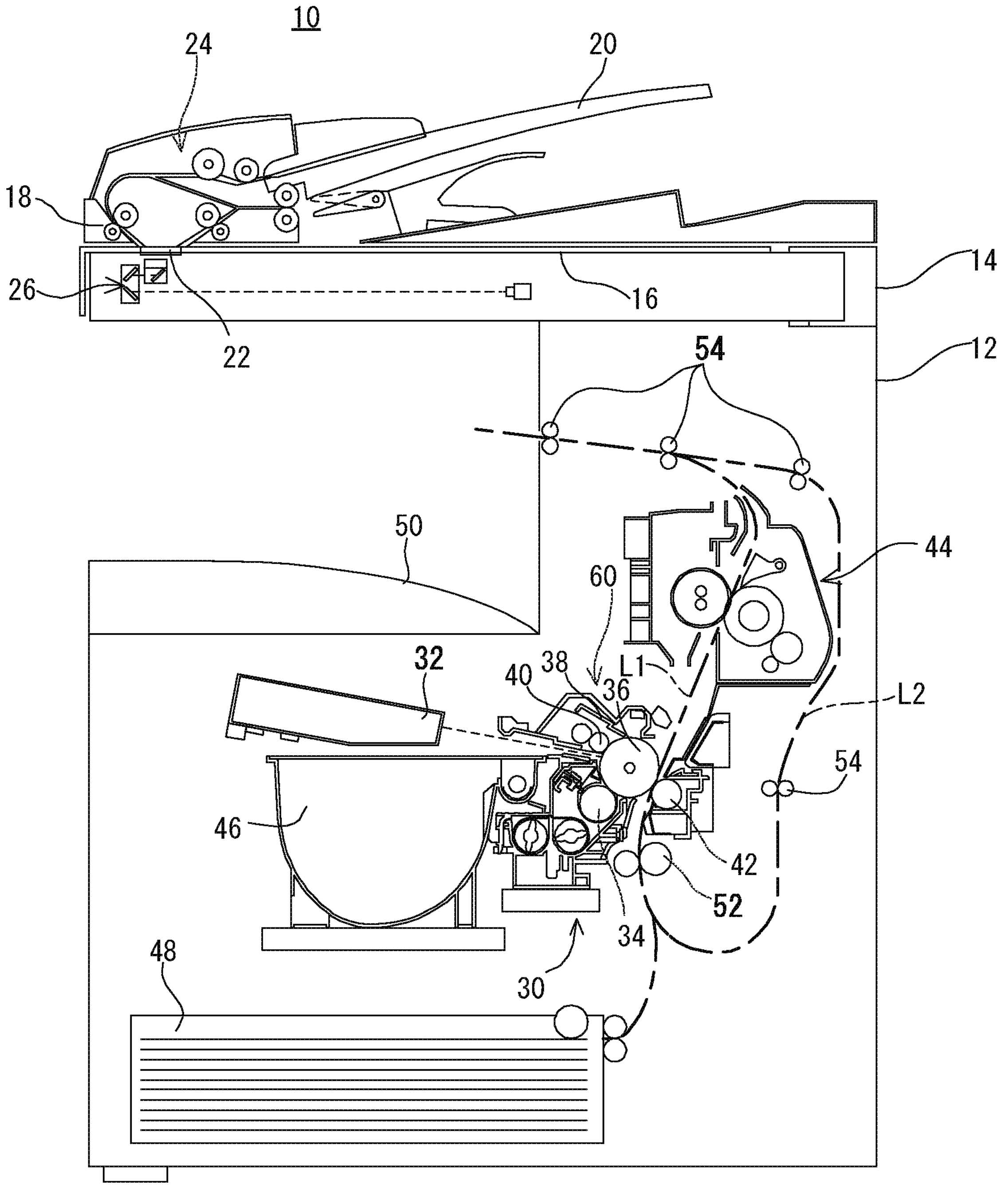
FIG. 1 is a schematic view illustrating an internal structure of an image-forming apparatus that includes a process unit according to a first embodiment of the disclosure.

Referring to FIG. 1, a process unit 60 of a first embodiment of the disclosure is configured by assembling a photoreceptor drum 36, a cleaning unit 38, and a charging unit 40, etc., and is removably provided on a device main body 12 of an image-forming apparatus 10. As described in more detail below, the process unit 60 includes a cam member 80, and by this cam member 80, a charging roller 68 included in the charging unit 40 can maintain a separate state in which the charging roller 68 is separated from the photoreceptor drum 36.

Note that, in this specification, a side that faces a standing position of a user operating the image-forming apparatus 10, that is, a side on which an operating unit (not shown) is provided, is defined as a front side (frontage side), and accordingly, a front and back direction (depth direction) of the image-forming apparatus 10 and its constituting members is defined. Note that the operating unit is provided on a front side of a sheet of FIG. 1. Further, a left and right direction (lateral direction) of the image-forming apparatus 10 and its constituting members is defined based on a state in which the image-forming apparatus 10 is seen from the front side.

Firstly, the configuration of the image-forming apparatus 10 is schematically described. As shown in FIG. 1, the image-forming apparatus 10 is a monochrome multifunction peripheral having a copy function, a printer function, a scanner function, and a facsimile function, etc. and forms a monochrome image on a sheet (recording medium) in an electrophotographic manner. The image-forming apparatus 10 includes a device main body 12 and an image reading device 14 disposed above the device main body 12.

The image reading device 14 includes a document placing table 16 made of a transparent material. A document platen cover 18 is mounted above the document placing table 16 via a hinge, etc. so as to be freely opened and closed. The document platen cover 18 is provided with an automatic document feeder (ADF) 24 that automatically feeds the document placed on a document placing tray 20 every one sheet to an image reading position 22. Further, the front side of the document placing table 16 is provided with an operating unit that receives an input operation such as a print start instruction by a user. The operating unit is provided with a display having a touch panel and a variety of operating buttons, etc.

Further, the image reading device 14 includes within it an image reading portion 26 including a light source, a plurality of mirrors, an image-forming lens, and a line sensor, etc. The image reading portion 26 exposes a surface of the document to light from the light source and guides reflected light from the surface of the document to the image-forming lens by the plurality of mirrors. Then, the image-forming lens forms an image from the reflected light on a light receiving element of the line sensor. The line sensor detects brightness and chromaticity, etc. of the reflected light forming an image on the light receiving element and an image data is created based on the image on the surface of the document. A charge coupled device (CCD) or a contact image sensor (CIS), etc. is used as the line sensor.

In the device main body 12, there are provided a controller (not shown) including a CPU and memory, etc. and an image-forming portion 30. The controller sends a control signal based on an input operation to the operating unit to each part of the image-forming apparatus 10 and allows the image-forming apparatus 10 to conduct a variety of actions.

The image-forming portion 30 includes an exposing unit 32, a developing unit 34, a photoreceptor drum 36, a cleaning unit 38, a charging unit 40, a transfer roller 42, a fusing unit 44, and a toner supplying device 46, etc., and forms an image on a sheet conveyed from a paper feeding tray 48, etc. and ejects an image-formed sheet to a paper ejecting tray 50. An image data read by the image reading portion 26 or an image data sent from an external computer, etc. is used as an image data for forming an image on the sheet.

The photoreceptor drum 36 is an image carrier including a drum main body 36*a* (see FIG. 2) on which surface a photoreceptor layer is formed, and is provided to extend in the front and back direction. The charging unit 40 includes a charging roller 68 and a cleaning roller 70 (see FIG. 4), etc., and charges the surface of the photoreceptor drum 36 (drum main body 36*a*) to a predetermined potential. The cleaning unit 38 removes residual toner on the surface of the photoreceptor drum 36 after image developing and image transferring. Further, the photoreceptor drum 36, the cleaning unit 38, and the charging unit 40 are assembled (to be a single cartridge) and thereby configure the process unit 60. The process unit 60 is removable from the front side of the device main body 12. The specific configuration of the process unit 60 will be described below.

The exposing unit 32 is configured as a laser scanning unit (LSU) including a laser diode and a polygon mirror, etc., and is disposed on the left side of the photoreceptor drum 36 at a predetermined distance from the photoreceptor drum 36. The exposing unit 32 exposes the surface of the charged photoreceptor drum 36 to light so as to form an electrostatic latent image according to the image data on the surface of the photoreceptor drum 36. The image developing unit 34 includes a developer tank and an image developing roller, etc. and is disposed below the photoreceptor drum 36. The image developing unit 34 supplies toner onto the surface of the photoreceptor drum 36 and the electrostatic latent image formed on the surface of the photoreceptor drum 36 is visualized by the toner (a toner image is formed).

The transfer roller 42 is a member for transferring the toner image formed on the surface of the photoreceptor drum 36 onto a sheet and is provided so as to press the photoreceptor drum 36. When the image is formed, a predetermined voltage is applied to the transfer roller 42 to thereby form a transfer electric field between the photoreceptor drum 36 and the transfer roller 42. Then, by the effect of the transfer electric field, the toner image formed on the outer peripheral surface of the photoreceptor drum 36 is transferred onto a sheet while the sheet passes through a nip region (transfer nip portion) between the photoreceptor drum 36 and the transfer roller 42.

The fusing unit 44 includes a heating roller and a pressing roller, etc. and is disposed above the process unit 60 and the transfer roller 42. The heating roller is heated by an internally-provided heat source to a predetermined fusing temperature. Then, when a sheet passes through a nip region (fusing nip portion) between the heating roller and the pressing roller, a toner image transferred on the sheet is melted, mixed, and pressed, and the toner image is heat-fixed onto the sheet.

Further, in the device main body 12, there is formed a first sheet conveying route L1 for conveying a sheet from the paper feeding tray 48, etc. via a resist roller 52, the transfer nip portion, and the fusing nip portion to the paper ejecting tray 50 (paper ejecting portion). Further, when conducting two-sided printing, there is formed a second sheet conveying route L2 for returning the sheet that has been printed by single-sided printing and has passed through the fusing unit 44 to the first sheet conveying route L1 on an upstream side of the transfer nip portion in a sheet conveyance direction. The first sheet conveying route L1 and the second sheet conveying route L2 are appropriately provided with a plurality of conveyance roller 54 for supplementary conveying a sheet.

Figure 2:
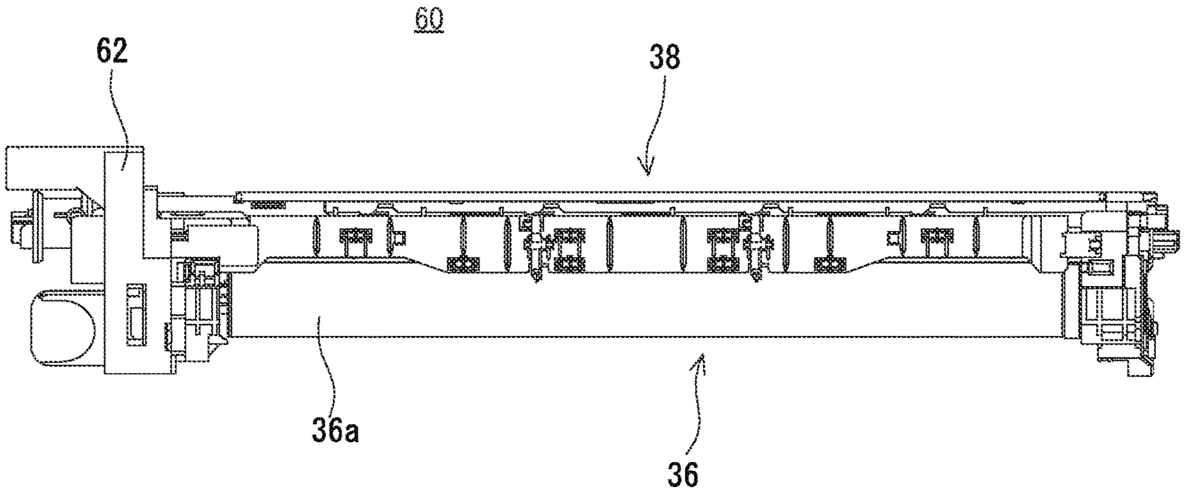
FIG. 2 is a side view illustrating the process unit.
Figure 3:
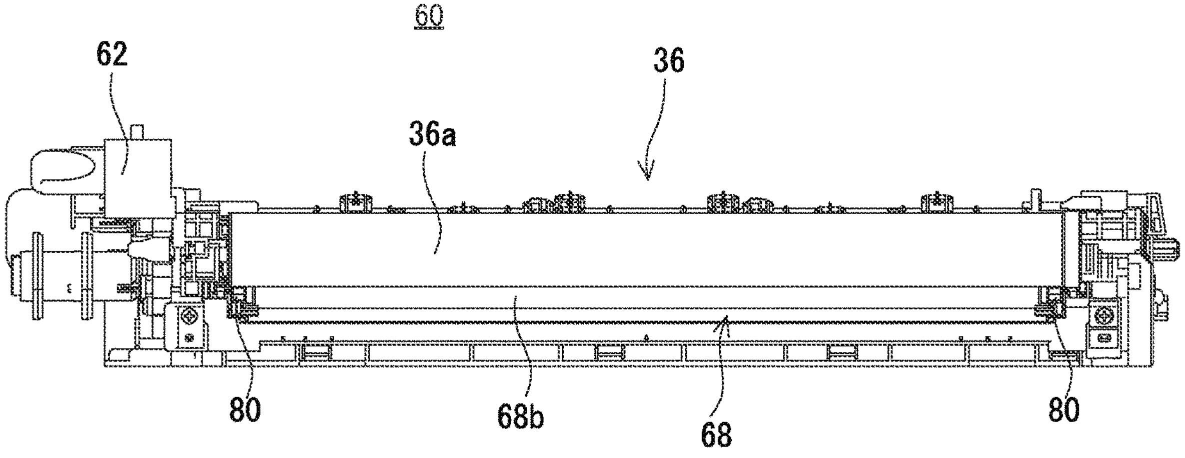
FIG. 3 is a bottom view illustrating the process unit.
Figure 4:
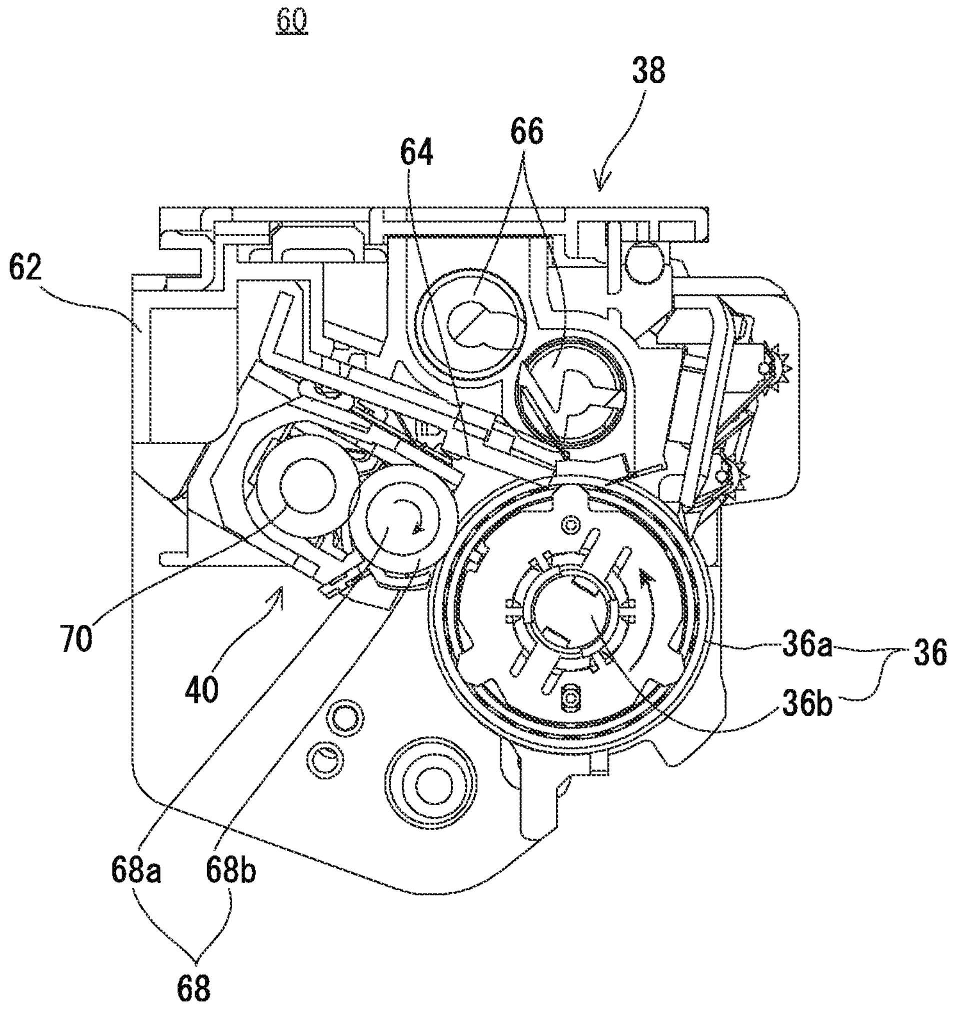
FIG. 4 is a sectional view illustrating the process unit.

Next, the configuration of the process unit 60 is specifically described. As shown in FIG. 2 to FIG. 4, the process unit 60 includes the photoreceptor drum 36, the cleaning unit 38, and the charging unit 40, etc. that are integrally supported by a process frame 62 in a predetermined placement manner.

The photoreceptor drum 36 includes the drum main body 36*a* configured such that a photoreceptor layer is formed on the surface of a cylindrical base body having conductivity. Flanges are fixedly mounted on both end portions of the base body so as to fit onto the both end portions of the base body, and a drum shaft 36*b* made of metal is provided so as to pass through the central portions of the flanges. Both end portions of the drum shaft 36*b* are rotatably supported by bearings provided on the process frame 62. Further, although not shown, a driving motor is coupled to a rear end portion of the drum shaft 36*b* via a coupling portion and a gear train, etc. The drum main body 36*a* rotates with the rotation of the drum shaft 36*b*. In other words, the photoreceptor drum 36 is supported by the process frame 62 so as to be rotatable around the drum shaft 36*b* and is rotated by a driving force transmitted from the driving motor.

The cleaning unit 38 includes a cleaning blade 64 and conveying members 66, etc. The cleaning unit 38 removes foreign substances such as residual toner on the surface of the photoreceptor drum 36 by the cleaning blade 64 and the conveying members 66 conveys the removed foreign substance into a waste toner box.

The charging unit 40 includes a charging roller 68 and a cleaning roller 70, etc. The charging roller 68 includes a shaft portion 68*a* that is a cylindrically-shaped (circular-column-shaped) conductive supporting body made of metal such as iron. A roller portion 68*b* including an elastic layer and a resistance layer is formed on the outer peripheral surface of the shaft portion 68*a* excluding both end portions of the shaft portion 68*a*. The elastic layer is made of a material having appropriate conductivity and elasticity in order to supply electricity to the photoreceptor drum 36 that is to be charged and to secure a good and uniform adherence to the photoreceptor drum 36. The resistance layer is provided in order to prevent softening oil or plasticizer included in the elastic layer from bleeding out and to adjust overall electric resistance of the charging roller 68, and is formed of a material having conductivity or semi conductivity.

The roller portion 68*b* of the charging roller 68 has an axial length a little shorter than an axial length of the drum main body 36*a* of the photoreceptor drum 36. Further, the shaft portion 68*a* of the charging roller 68 is positioned so as to be parallel to the drum shaft 36*b* of the photoreceptor drum 36. Then, the charging roller 68 charges the surface of the photoreceptor drum 36 (drum main body 36*a*) to a predetermined potential while rotating dependently with the rotation of the photoreceptor drum 36 with the outer surface of the roller portion 68*b* contacting (attaching) to the outer surface of the drum main body 36*a* at a predetermined pressure.

Further, although not shown, both end portions of the shaft portion 68*a* of the charging roller 68 are rotatably supported by bearings. The bearings are mounted to the frame so as to be moveable in a radial direction of the photoreceptor drum 36. In other words, the charging roller 68 supported by the bearings can move in the radial direction of the photoreceptor drum 36 (can contact to and separate from the photoreceptor drum 36) and is provided so as to be switchable between a separate state in which the charging roller 68 is separated from the photoreceptor drum 36 and a contact state in which the charging roller 68 contacts the photoreceptor drum 36. Further, each of the bearings is provided with an energizing member such as a compression spring. This energizing member is a member for bringing the charging roller 68 into contact with the photoreceptor drum 36 at a predetermined pressure and energizes the charging roller 68 via the bearings toward the photoreceptor drum 36.

Further, the cleaning roller 70 is disposed to contact to the outer peripheral surface of the charging roller 68 (roller portion 68*b*) at a position opposite to the photoreceptor drum 36. The cleaning roller 70 includes a cylindrically-shaped metal shaft and an elastic foam body (sponge layer) covering the outer peripheral surface of the metal shaft, and removes foreign substances such as toner adhering to an outer peripheral surface of the charging roller 68. Further, the cleaning roller 70 is provided so as to be able to be separated from and brought into contact with the charging roller 68, and is brought into contact with the charging roller 68 by an energizing member (not shown) at a predetermined pressure.

In the process unit 60 configured as described above, there may be a long time from the shipment of the image-forming apparatus 10 or the process unit 60 to the start of use of the image-forming apparatus 10 or the process unit 60. During this time, if the photoreceptor drum 36 and the charging roller 68 are maintained in contact with each other, poor image quality may occur due to bleeding and deforming of the charging roller 68. Therefore, it is contemplated that the photoreceptor drum 36 and the charging roller 68 are maintained in the separate state when shipping the image-forming apparatus 10 or the process unit 60 and the process unit 60 is provided with a mechanism that brings the photoreceptor drum 36 and the charging roller 68 into the contact state when the use of the image-forming apparatus 10 or the process unit 60 is started. However, it is preferable that such a mechanism can be achieved by a simple structure.

According to the above, in the first embodiment, by providing the process unit 60 with a cam member 80 described below, it is possible by a simple structure to maintain the charging roller 68 in the separate state from the photoreceptor drum 36 and to automatically bring the charging roller 68 into the contact state to the photoreceptor drum 36 when the use of the process unit 60 is started. The first embodiment will be specifically described below.

Figure 5:
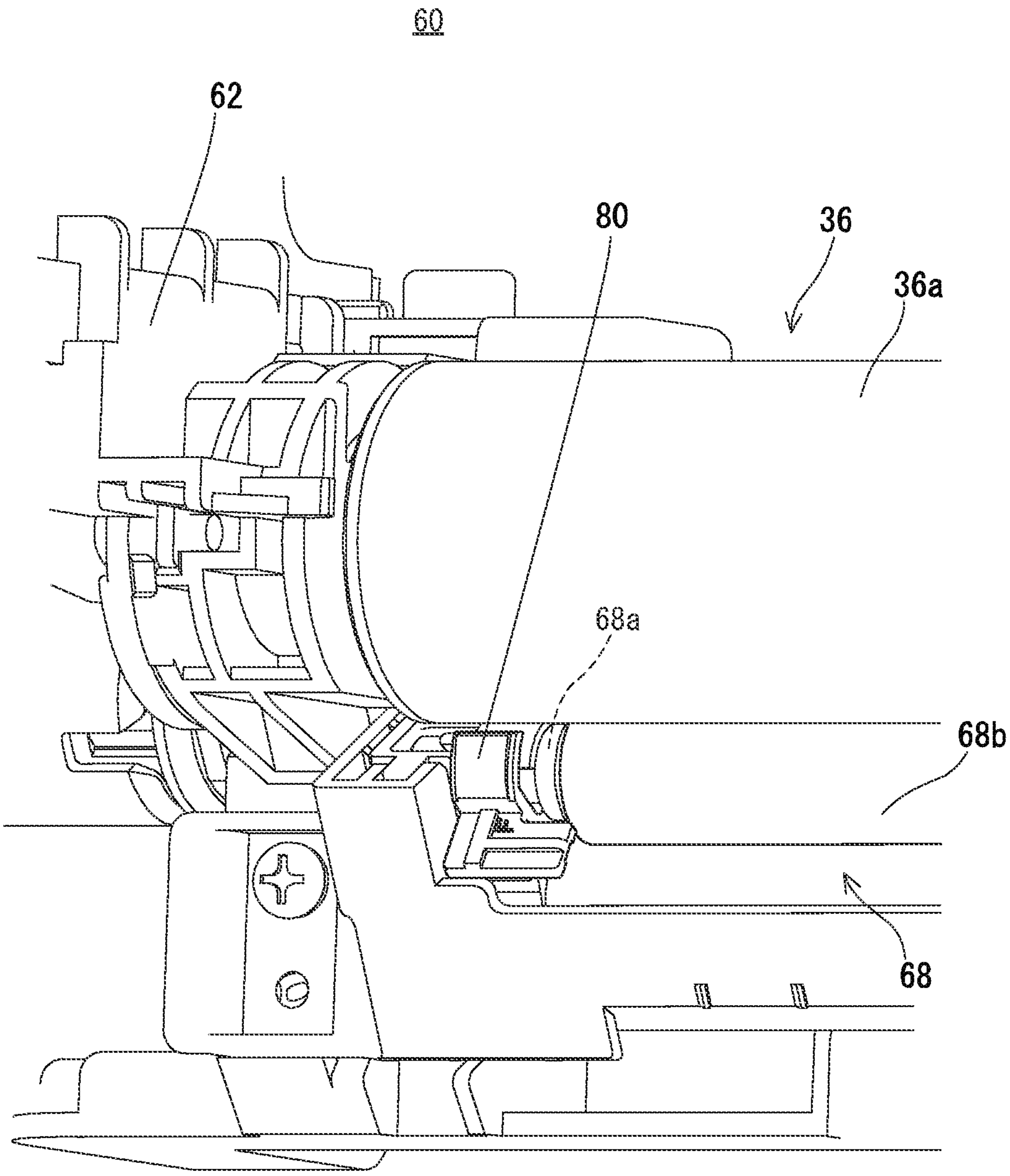
FIG. 5 is a view illustrating the periphery of a cam member of the process unit.

Referring to FIG. 3 and FIG. 5, the cam member 80 is rotatably provided on each of both end portions of the shaft portion 68*a* of the charging roller 68 (that is, both sides of the roller portion 68*b* that is a photoreceptor charging region). The cam member 80 is provided at a position within a longitudinal range of the drum main body 36*a* of the photoreceptor drum 36.

Figure 6:
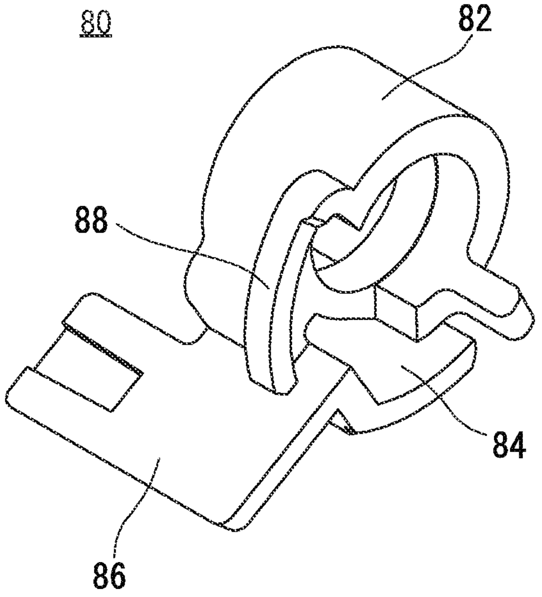
FIG. 6 is a perspective view illustrating the cam member.
Figure 7:
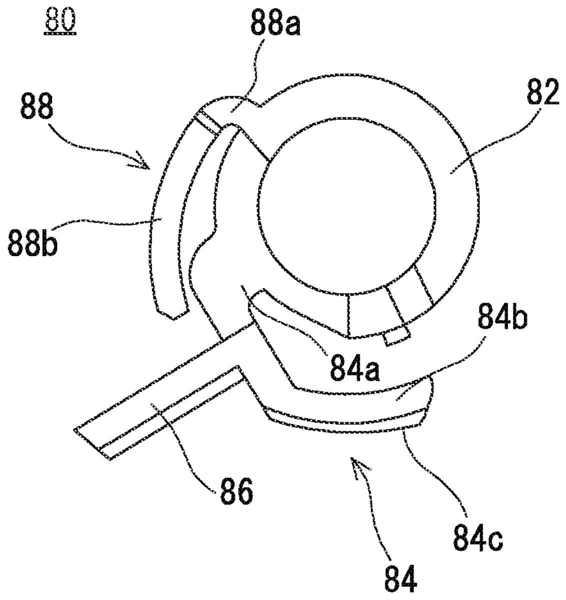
FIG. 7 is a front view illustrating the cam member.
Figure 8:
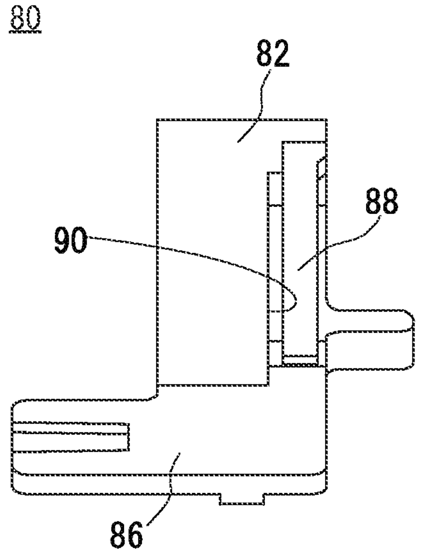
FIG. 8 is a side view illustrating the cam member.

As shown in FIG. 6 to FIG. 8, the cam member 80 is a member that is used as a spacer for maintaining the charging roller 68 in the separate state from the photoreceptor drum 36, and has a mounting portion 82 and a contact portion 84, etc. Although a material forming the cam member 80 is not specifically limited, it is preferable that the cam member 80 is made of a flexible material such as a synthetic resin or rubber, etc. for elastically deforming the contact portion 84 and preventing the photoreceptor drum 36 from being damaged.

The mounting portion 82 is a portion that externally fits to the shaft portion 68*a* of the charging roller 68, and is formed to have an annular shape (ring shape). The thickness of the mounting portion 82 is set to be smaller than the thickness of the roller portion 68*b* of the charging roller 68.

The contact portion 84 is a portion that contacts an outer surface of the drum main body 36*a* of the photoreceptor drum 36 (specifically, photoreceptor layer) to maintain the charging roller 68 in the separate state, and is formed to protrude to the outside of the outer surface of the mounting portion 82. The contact portion 84 has a plate spring shape that is elastically deformable in a direction to be separated from and brought into contact with the charging roller 68, and can energize the drum main body 36*a* in a direction separating from the charging roller 68. Specifically, the contact portion 84 has a protruding portion 84*a* that protrudes from an outer surface of the mounting portion 82 and a curved-plate-shaped arm portion 84*b* that is curved at the end of the protruding portion 84*a* and extends along the outer surface of the mounting portion 82. The arm portion 84*b* can be displaced around the base end portion thereof in the direction to be separated from and brought into contact with the charging roller 68 and the outer surface of the end portion of the arm portion 84*b* is a contact surface 84*c* that contacts the drum main body 36*a*. By forming the contact portion 84 to be elastically deformable as described above, it is possible that, even if an oscillation or an impact is applied to the process unit 60, the elasticity of the contact portion 84 can absorb the oscillation or the impact. Therefore, unintended rotation of the cam member 80 can be prevented and a state in which the contact portion 84 contacts the drum main body 36*a* (that is, the separate state) can be appropriately maintained.

The thickness of the arm portion 84*b* of the contact portion 84 is set to be such a thickness that the sum of the thickness of the arm portion 84*b* and the thickness of the mounting portion 82 is larger than the thickness of the roller portion 68*b* of the charging roller 68. This makes it possible to maintain the charging roller 68 in the separate state even if the contact portion 84 is completely collapsed (that is, the arm portion 84*b* contacts the mounting portion 82) due to an aged deterioration by a long-term compression or an elastic deformation when an oscillation or an impact is applied.

Further, the cam member 80 has a rectangular-plate-shaped grip portion 86 for manually rotating the cam member 80. The grip portion 86 is formed to protrude from the outer surface of the base end portion of the contact portion 84. A user can easily switch the charging roller 68 between the separate state and the contact state by gripping the grip portion 86 to rotate the cam member 80. Further, the grip portion 86 functions as a first restricting portion that restricts reverse rotation of the cam member 80 when the charging roller 68 is in the separate state and normal rotation of the cam member 80 when the charging roller 68 is in the contact state.

Further, the cam member 80 has a second restricting portion 88 that restricts reverse rotation of the cam member 80 when the charging roller 68 is in the contact state. The second restricting portion 88 has a plate spring shape that is elastically deformable in a radial direction of the mounting portion 82, and has a protruding portion 88*a* that protrudes from the outer surface of the mounting portion 82 and a curved-stick-shaped arm portion 88*b* that is curved at the end of the protruding portion 88*a* and extends along the outer surface of the mounting portion 82. Further, a cutout 90 is formed on the mounting portion 82 and the contact portion 84 at the position corresponding to the arm portion 88*b*. The cutout 90 allows the second restricting portion 88 to go into the cutout 90 when the second restricting portion 88 elastically deforms radially inwardly.

Further, although not shown, the contact surface 84*c* of the contact portion 84 can be formed to have a larger coefficient of friction (gripping force) than that of the other portions of the cam member 80. For example, by making the contact surface 84*c* of an elastic material such as urethane rubber (that is, attaching an elastic member on an outer surface of the end portion of the arm portion 84*b*), the coefficient of friction of the contact surface 84*c* can be increased. In another case, by making the contact surface 84*c* rough-surfaced, the coefficient of friction of the contact surface 84*c* can be increased. In this way, in a state in which the contact surface 84*c* contacts the drum main body 36*a*, the cam member 80 can be surely rotated with the rotation of the photoreceptor drum 36.

Figure 9:
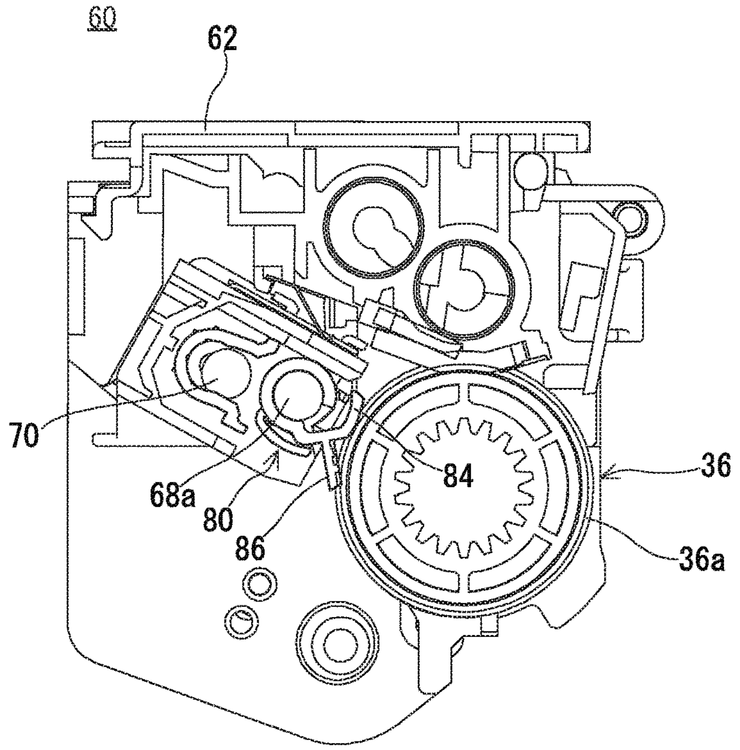
FIG. 9 is a sectional view illustrating the periphery of the cam member when a charging roller is in a separate state.
Figure 10:
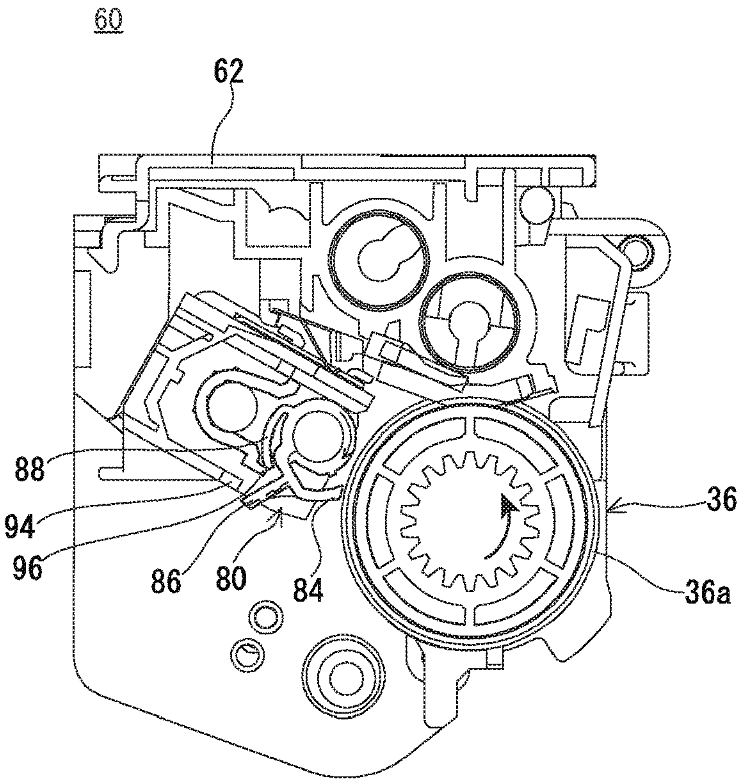
FIG. 10 is a sectional view illustrating the periphery of the cam member when the charging roller is in a contact state.

Next, referring to FIG. 9 and FIG. 10, action of the process unit 60 including the above-described cam member 80 will be described. As shown in FIG. 9, when shipping, etc., the cam member 80 is maintained in a rotation position (separation maintaining position) in which the contact portion 84 contacts the drum main body 36*a* of the photoreceptor drum 36 (specifically, photoreceptor layer). In this state, the charging roller 68 is maintained in the separate state in which the charging roller 68 resists the energizing force of the energizing member to separate from the photoreceptor drum 36 by the contact portion 84 pushing the drum main body 36*a*. Further, in the separate state, rotation of the cam member 80 in a reverse direction (in FIG. 9 and FIG. 10, counter clockwise direction) is restricted by the end portion of the grip portion 86 (first restricting portion) contacting to the drum main body 36*a*.

Further, when the use of the image-forming apparatus 10 is started and the photoreceptor drum 36 is rotated in a normal direction (in FIG. 9 and FIG. 10, counter clockwise direction), the cam member 80 rotates dependently in the normal direction (in FIG. 9 and FIG. 10, clockwise direction) by frictional force between the contact surface 84*c* of the contact portion 84 and the drum main body 36*a*. Then, as shown in FIG. 10, the contact of the contact portion 84 to the drum main body 36*a* is released and the charging roller 68 is brought into contact with the photoreceptor drum 36 by energizing force of the energizing member. In other words, the charging roller 68 is switched from the separate state to the contact state. In the contact state, the outer surface of the mounting portion 82 of the cam member 80 (a portion on which the contact portion 84, etc. are not formed) is placed at the position facing the photoreceptor drum 36, and hence, the cam member 80 does not contact to the photoreceptor drum 36. Therefore, when the photoreceptor drum 36 rotates, the cam member 80 does not rotate dependently.

Further, in the contact state, the end portion of the grip portion 86 (first restricting portion) is engaged with a first engagement portion 94 formed on the flame, and hence, the rotation of the cam member 80 in the normal direction is restricted. Further, the end portion of the second restricting portion 88 of the cam member 80 is engaged with a second locking portion 96 formed on the flame, and hence, the rotation of the cam member 80 in the reverse direction is restricted. In other words, when the charging roller 68 is in the contact state, the rotation of the cam member 80 in both of the normal direction and the reverse direction is restricted so as to be maintained in a rotational position (non-contact position) in which the cam member 80 does not contact to the photoreceptor drum 36, and hence, the contact state of the charging roller 68 is appropriately maintained.

Note that, when switching the charging roller 68 from the contact state to the separate state, a user may grip the grip portion 86 of the cam member 80 and manually rotate the cam member 80 in the reverse direction.

As described above, according to the first embodiment, by the simple configuration in which the shaft portion 68*a* of the charging roller 68 is provided with the cam member 80, the charging roller 68 can be appropriately separated from and brought into contact with the photoreceptor drum 36. Further, since the cam member 80 is provided at the potion within the longitudinal range of the drum main body 36*a* of the photoreceptor drum 36, it is possible to prevent the process unit 60 from becoming larger in the longitudinal direction.

Second Embodiment

Next, referring to FIG. 11, the process unit 60 of a second embodiment of the disclosure will be described. The second embodiment is different from the above-described first embodiment in that the process unit 60 includes a one-way clutch 100. The other parts are similar to those of the first embodiment, and hence, the parts common to the above-described first embodiment are indicated by the same reference numerals and overlapping explanation is omitted or simplified.

Figure 11:
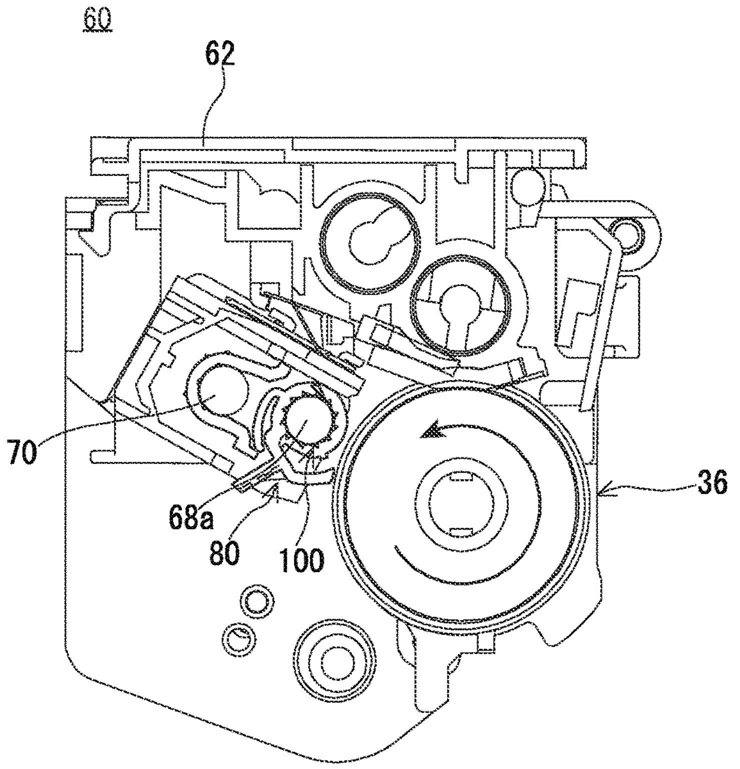
FIG. 11 is a sectional view illustrating the periphery of a cam member of a process unit of a second embodiment of the disclosure.

As shown in FIG. 11, in the second embodiment, the process unit 60 includes the one-way clutch 100 that does not transfer the rotation of the charging roller 68 to the cam member 80 when the charging roller 68 rotates in the normal direction (in FIG. 11, clockwise direction), and transfers the rotation of the charging roller 68 to the cam member 80 when the charging roller 68 rotates in the reverse direction (in FIG. 11, counter clockwise direction). Simply describing, the ratchet-type one-way clutch 100 is used in the second embodiment.

The one-way clutch 100 is configured by a gear member mounted on the shaft portion 68*a* of the charging roller 68 and pawl members mounted on the cam member 80. Note that the one-way clutch 100 is not limited to a ratchet type one-way clutch and other type such as a sprag type can be employed.

In the process unit 60 including the above-described one-way clutch 100, it is possible to switch the charging roller 68 from the contact state to the separate state by rotating the photoreceptor drum 36 in the reverse direction. In other words, when the charging roller 68 is in the contact state, the charging roller 68 and the cam member 80 are rotated in the reverse direction by rotating the photoreceptor drum 36 in the reverse direction (in FIG. 11, clockwise direction). Then, the charging roller 68 can be switched to the separate state by bringing the contact portion 84 of the cam member 80 into contact with the outer surface of the drum main body 36*a*.

According to the second embodiment, similarly to the first embodiment, the charging roller 68 can be appropriately separated from and brought into contact with the photoreceptor drum 36 by the simple configuration.

Further, according to the second embodiment, the charging roller 68 can be automatically switched from the contact state to the separate state by rotating the photoreceptor drum 36 in the reverse direction.

Third Embodiment

Next, referring to FIG. 12, the process unit 60 of the third embodiment of the disclosure will be described. The third embodiment is different from the above-described first embodiment in the configuration of the cam member 80. The other parts are similar to those of the first embodiment, and hence, the parts common to the above-described first embodiment are indicated by the same reference numerals and overlapping explanation is omitted or simplified.

Figure 12:
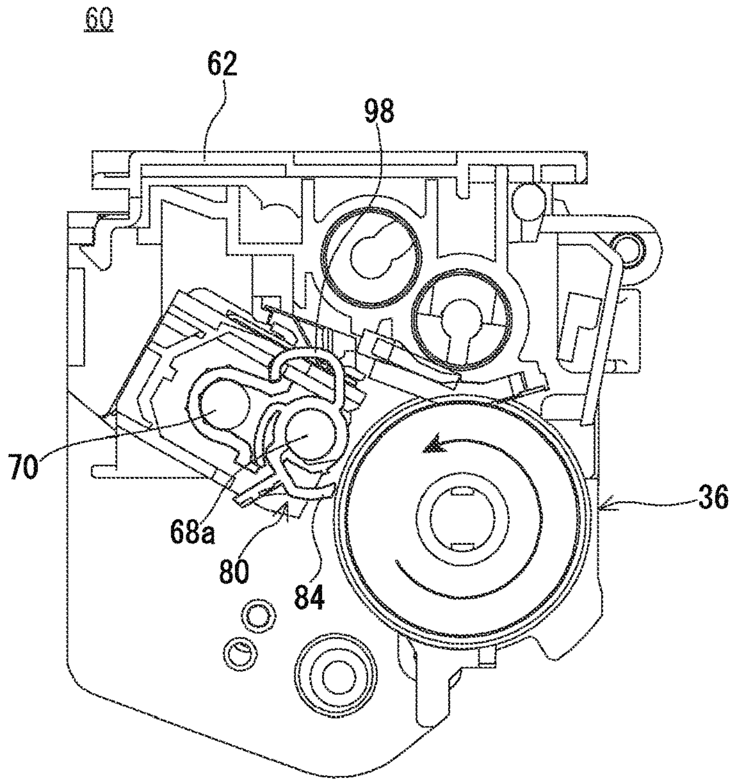
FIG. 12 is a sectional view illustrating the periphery of a cam member of a process unit of a third embodiment of the disclosure.

As shown in FIG. 12, in the third embodiment, the cam member 80 further includes a second contact portion 98. The second contact portion 98 is formed at the position opposite to the contact portion 84 to protrude to an outside of the outer surface of the mounting portion 82. When the charging roller 68 is in the separate state, the second contact portion 98 contacts the outer surface of the cleaning roller 70, and thereby, the cleaning roller 70 is brought into the separate state away from the charging roller 68. Further, when the charging roller 68 is in the contact state, the contact of the second contact portion 98 to the outer surface of the cleaning roller 70 is released to thereby bring the cleaning roller 70 into the contact state with the charging roller 68.

According to the third embodiment, similarly to the first embodiment, charging roller 68 can be appropriately separated from and brought into contact with the photoreceptor drum 36 by the simple configuration.

Further, according to the third embodiment, when the charging roller 68 is separated from and brought into contact with the photoreceptor drum 36, the cleaning roller 70 can be simultaneously separated from and brought into contact with the charging roller 68.

Note that the specific configurations of the image-forming apparatus 10 described in this specification are merely an example, and hence, can be appropriately changed according to the practical product specification. For example, the image-forming apparatus is not necessarily a multifunction peripheral, and can be any one of a copying machine, a facsimile, and a printer, etc., or a multifunctional printer combining at least two of them. Further, the image-forming apparatus is not limited to a monochrome machine and may be a color machine that can form a multi-color image.

Further, the specific shapes of parts and sizes, etc. described above are merely an example and can be appropriately changed as necessary according to a product specification, etc.

What is claimed is:

1. A process unit comprising:

a photoreceptor drum;

a charging roller that charges the photoreceptor drum; and a cam member that is rotatably provided on each of both end portions of a shaft portion of the charging roller at a position within a longitudinal range of a drum main body of the photoreceptor drum, wherein the charging roller is provided so as to be switchable between a separate state in which the charging roller is separated from the photoreceptor drum and a contact state in which the charging roller contacts the photoreceptor drum, the cam member includes:

an annular-shaped mounting portion that externally fits to the shaft portion of the charging roller; and a contact portion that protrudes to an outside of an outer surface of the mounting portion, the charging roller is maintained in the separate state by bringing the contact portion of the cam member into contact with an outer surface of the drum main body, the charging roller is switched from the separate state to the contact state by rotating the cam member in a normal direction dependently with a rotation of the photoreceptor drum in the normal direction due to a frictional force between the drum main body and the contact portion to release the contact of the contact portion to the drum main body, and a coefficient of friction of a contact surface of the contact portion of the cam member that contacts the drum main body is larger than a coefficient of friction of parts other than the contact surface of the cam member.

2. The process unit according to claim 1, wherein the contact surface of the contact portion is made of an elastic material.

3. The process unit according to claim 1, wherein the contact portion has a plate spring shape that is elastically deformable in a radial direction of the charging roller.

4. The process unit according to claim 1, wherein the cam member further includes a grip portion for manually rotating the cam member.

5. The process unit according to claim 1, wherein the cam member further includes a first restricting portion that restricts a reverse rotation of the cam member when the charging roller is in the separate state and restricts a normal rotation of the cam member when the charging roller is in the contact state.

6. The process unit according to claim 1, wherein the cam member further includes a second restricting portion that restricts a reverse rotation of the cam member when the charging roller is in the contact state.

7. The process unit according to claim 1, further comprising a cleaning roller that is capable of being separated from and brought into contact with the charging roller, wherein the cam member is formed to protrude to the outside of the outer surface of the mounting portion at a position opposite the contact portion, and includes a second contact portion that is capable of bringing the charging roller into contact with the cleaning roller and separating the charging roller from the cleaning roller.

8. The process unit according to claim 1, further comprising a one-way clutch that does not transfer a rotation of the charging roller to the cam member when the charging roller makes a normal rotation, and that transfers the rotation of the charging roller to the cam member when the charging roller makes a reverse rotation, wherein, when the charging roller is in the contact state, the charging roller is switchable from the contact state to the separate state by bringing the contact portion of the cam member into contact with the outer surface of the drum main body by a reverse rotation of the photoreceptor drum to cause the charging roller and the cam member to make the reverse rotation.

9. An image-forming apparatus comprising the process unit according to claim 1.

10. A process unit comprising:

a photoreceptor drum;

a charging roller that charges the photoreceptor drum; and a cam member that is rotatably provided on each of both end portions of a shaft portion of the charging roller at a position within a longitudinal range of a drum main body of the photoreceptor drum, wherein the charging roller is provided so as to be switchable between a separate state in which the charging roller is separated from the photoreceptor drum and a contact state in which the charging roller contacts the photoreceptor drum, the cam member includes:

an annular-shaped mounting portion that externally fits to the shaft portion of the charging roller; and a contact portion that protrudes to an outside of an outer surface of the mounting portion, the charging roller is maintained in the separate state by bringing the contact portion of the cam member into contact with an outer surface of the drum main body, the charging roller is switched from the separate state to the contact state by rotating the cam member in a normal direction dependently with a rotation of the photoreceptor drum in the normal direction due to a frictional force between the drum main body and the contact portion to release the contact of the contact portion to the drum main body, and the contact portion has a plate spring shape that is elastically deformable in a radial direction of the charging roller.

11. The process unit according to claim 10, wherein the cam member further includes a grip portion for manually rotating the cam member.

12. The process unit according to claim 10, wherein the cam member further includes a first restricting portion that restricts a reverse rotation of the cam member when the charging roller is in the separate state and restricts a normal rotation of the cam member when the charging roller is in the contact state.

13. The process unit according to claim 10, wherein the cam member further includes a second restricting portion that restricts a reverse rotation of the cam member when the charging roller is in the contact state.

14. The process unit according to claim 10, further comprising a cleaning roller that is capable of being separated from and brought into contact with the charging roller, wherein the cam member is formed to protrude to the outside of the outer surface of the annular-shaped mounting portion at a position opposite the contact portion, and includes a second contact portion that is capable of bringing the charging roller into contact with the cleaning roller and separating the charging roller from the cleaning roller.

15. The process unit according to claim 10, further comprising a one-way clutch that does not transfer a rotation of the charging roller to the cam member when the charging roller makes a normal rotation, and that transfers the rotation of the charging roller to the cam member when the charging roller makes a reverse rotation, wherein when the charging roller is in the contact state, the charging roller is switchable from the contact state to the separate state by bringing the contact portion of the cam member into contact with the outer surface of the drum main body by a reverse rotation of the photoreceptor drum to cause the charging roller and the cam member to make the reverse rotation.

16. An image-forming apparatus comprising the process unit according to claim 10.

17. A process unit comprising:

a photoreceptor drum;

a charging roller that charges the photoreceptor drum;

a cleaning roller that is capable of being separated from and brought into contact with the charging roller; and a cam member that is rotatably provided on each of both end portions of a shaft portion of the charging roller at a position within a longitudinal range of a drum main body of the photoreceptor drum, wherein the charging roller is provided so as to be switchable between a separate state in which the charging roller is separated from the photoreceptor drum and a contact state in which the charging roller contacts the photoreceptor drum, the cam member includes:

an annular-shaped mounting portion that externally fits to the shaft portion of the charging roller; and a contact portion that protrudes to an outside of an outer surface of the mounting portion, the charging roller is maintained in the separate state by bringing the contact portion of the cam member into contact with an outer surface of the drum main body, the charging roller is switched from the separate state to the contact state by rotating the cam member in a normal direction dependently with a rotation of the photoreceptor drum in the normal direction due to a frictional force between the drum main body and the contact portion to release the contact of the contact portion to the drum main body, and the cam member is formed to protrude to the outside of the outer surface of the mounting portion at a position opposite the contact portion, and includes a second contact portion that is capable of bringing the charging roller into contact with the cleaning roller and separating the charging roller from the cleaning roller.

* * * * *